United States Patent Office 3,109,707
Patented Nov. 5, 1963

3,109,707
PRODUCING VANADIUM TRICHLORIDE
Leland R. Lyons, Boulder City, Nev., assignor to Titanium Metals Corporation of America, New York, N.Y., a corporation of Delaware
No Drawing. Filed Apr. 24, 1961, Ser. No. 104,796
3 Claims. (Cl. 23—87)

This invention relates to the production of vanadium chloride, and more particularly the production of vanadium trichloride substantially free from oxygen.

Processes heretofore known for producing vanadium chloride have not successfully produced pure vanadium chloride by a simple, inexpensive treatment of available ores or concentrates. The processes heretofore employed and proposed have been complex and expensive, and it has been difficult to obtain vanadium chloride of desired purity, particularly with respect to its oxygen content, to make it useful for specific purposes such as a feed material in reduction methods to produce pure metal.

It is therefore an object of this invention to provide an improved process for producing vanadium trichloride. Another object of this invention is to provide a process for producing substantially oxygen-free vanadium trichloride. Still another object of this invention is to provide an efficient and economical method for producing vanadium trichloride from vanadium oxytrichloride. These and other objects of this invention will be apparent from the following description thereof.

This invention in its broad aspects contemplates producing substantially oxygen-free vanadium trichloride by reacting vanadium oxytrichloride with sulfur at elevated temperature and in the presence of chlorine. Preferably the vanadium oxytrichloride will have been previously treated to eliminate metallic impurities and when vanadium trichloride is produced according to this invention as hereinafter explained in detail, it will be found to be as substantially free from oxygen and also sulfur, even though the raw material is an oxygen containing compound and sulfur is employed as the reducing agent. The vanadium oxytrichloride and the sulfur and chlorine are introduced into a reaction zone maintained at a temperature between 450° C. and 650° C. The sulfur combines with the oxygen content of the vanadium oxytrichloride to form a hot gaseous mixture containing vanadium trichloride and sulfur dioxide, and the presence of a chlorine atmosphere appears to promote the reaction to produce vanadium trichloride substantially free from oxygen and sulfur. The hot gaseous mixture is cooled to condense solid vanadium trichloride, $VCl_3$.

The vanadium oxytrichloride employed as the raw feed material may be obtained from any convenient source. It may economically be obtained by chlorination of a vanadium ore, or by-product from treatment of other ores, which may contain vanadium in any of its common oxidic forms such as $VO$, $V_2O_2$, $V_2O_3$, $V_2O_4$ or $V_2O_5$. An advantageous process includes chlorination in a so-called fluid bed type of furnace with carbon; particles of vanadium oxide material and carbon being suspended and agitated in an upwardly flowing column of chlorine gas. The reaction proceeds readily at temperatures between 550° C. and 800° C. to produce vanadium oxychloride, principally the oxytrichloride, $VOCl_3$, which is formed as a volatile constituent in the gas mixture emanating from the furnace. The $VOCl_3$ is separated by condensation from the hot gas mixture, and is preferably purified to separate impurities such as chloride salts of aluminum, silicon and iron by an additional fractional distillation step. The process of this invention will produce vanadium trichloride substantially free from oxygen and sulfur but for utmost purity with particular regard to metallic impurities including the above mentioned, these should be separated from the vanadium oxytrichloride before treatment with sulfur and chlorine as herein described.

The vanadium oxytrichloride, which at ordinary temperatures is a conveniently handled liquid, is introduced together with sulfur and chlorine into a reaction zone which may advantageously be the interior of a suitable furnace, such as a shaft furnace. The interior of the shaft furnace is maintained at a temperature of between 450° C. and 650° C. to provide an elevated temperature reaction zone and suitable provisions are made for charging materials into this reaction zone, and for drawing off the product and by-products which will emanate as a hot gaseous mixture.

The sulfur which is preferably of pure commercial grade may be employed as a powdered solid, or may be melted and fed as a liquid. It is to be introduced into the reaction zone in amount in excess of that required theoretically to combine with the oxygen content of the vanadium oxytrichloride to form sulfur dioxide, $SO_2$. The excess amount is not critical; however, if more than five times the theoretical or stoichiometric of sulfur amount is employed additional excess chlorine will also be needed as hereinafter explained, and, moreover, if sulfur reagents are recycled in a continuous process, the recirculating load will be excessively high. Therefore, the sulfur introduced should be in excess of the theoretical to produce $SO_2$ from the oxygen content of the vanadium oxytrichloride and up to five times such amount.

The chlorine, which may be introduced into the reaction zone as chlorine gas, will preferably be of commercial purity and is to be introduced in an amount in excess of the amount required theoretically to form sulfur monochloride with the excess sulfur introduced. It is apparently necessary to obtain the desired results from the practice of this invention, to conduct the deoxidation of the vanadium oxychloride in the presence of free chlorine. The excess sulfur, that is, that over the amount to theoretically combine with the oxygen in the vanadium oxychloride, will however tend to react with chlorine to form sulfur monochloride, $S_2Cl_2$. Therefore, in order to maintain the desired chlorine atmosphere sufficient chlorine is to be introduced to provide an amount in excess of that required theoretically to combine with the excess sulfur to form $S_2Cl_2$ and up to ten times such amount. An amount over ten times theoretical involves substantial waste of this reagent, or in a continuous system adds inordinately to the recirculating load. Apparently the higher chloride containing sulfur chloride compounds such as $SCl_2$ and $SCl_4$ are not stable at the temperature in the reaction zone.

Alternatively the sulfur and chlorine required may be introduced into the reaction zone at least in part as a sulfur chloride compound such as $S_2Cl_2$ or $SCl_2$. These compounds are liquids at ordinary temperature, are easily handled and their sulfur content appears to readily react with the oxygen of the vanadium oxychloride to form $SO_2$. Utilization of their sulfur content also releases chlorine in the reaction zone atmosphere. The same amounts of sulfur and chlorine are, however, required, whether these are introduced as elements or as sulfur chloride compound. Often sulfur chloride, particularly of lower chloride content such as $S_2Cl_2$ and $SCl_2$, and free chlorine will be necessary to provide the desired excess amounts of sulfur and chlorine.

Sulfur dichloride, $SCl_2$, is a desirable compound for introduction as above described. It will be found to be advantageous when employed in a continuous process since excess chlorine in the by-product gases may be absorbed in sulfur monochloride, $S_2Cl_2$, to reform the dichloride, $SCl_2$, which is recycled as at least part of the $SCl_2$, introduced into the reaction zone.

When vanadium oxytrichloride, sulfur and chlorine are introduced into the reaction zone, the reaction to produce vanadium trichloride and sulfur dioxide as a by-product, at a temperature between 450° C. and 650° C., proceeds very rapidly. At temperatures lower than 450° C. the reaction becomes sluggish and it is more difficult to produce vanadium chloride substantially free from oxygen compounds and uncontaminated with unreacted vanadium oxychloride. Temperatures above 650° C. are not necessary since adequate and efficient reaction speed can be obtained within the defined range of 450° C. to 650° C.

In addition to the principal by-product, sulfur dioxide, formation of incidental amounts of other sulfur, oxygen and chlorine by-products may take place. These may include sulfur oxytetrachloride, $S_2OCl_4$, as well as other combinations of these elements. In addition, the excess sulfur present, which is employed to drive the vanadium oxychloride deoxygenating reaction, combines with chlorine in the reaction zone atmosphere to form by-product sulfur monochloride, $S_2Cl_2$. Even if sufficient chlorine is present over and above that required to form sulfur monochloride, it has not been found that higher chlorine-containing sulfur compounds will be formed to any great extent, since these are generally much less stable at the elevated temperature employed than the sulfur monochloride.

The reaction results in a gaseous mixture containing vanadium trichloride, chlorine and sulfur monochloride as well as other by-products. This hot gaseous mixture which outflows from the reaction zone, is cooled to condense the vanadium trichloride. In one embodiment, according to this invention, the hot gaseous mixture may be cooled to a temperature between 150° and 200° C. At this temperature the vanadium trichloride will readily condense in solid form on a suitably cooled surface employed as part of conventional condensation apparatus. However, at this relatively high condensation temperature the sulfur monochloride and other by-product compounds if present, will still be volatile and therefore vanadium trichloride will be condensed, and will also be separated from these contaminants. In an alternative embodiment the hot gaseous mixture may be cooled to a substantially lower temperature, if convenient or advisable to a temperature of substantially normal room temperature, or in any event below 135° C. Condensation at such lower temperature results in formation of solid vanadium trichloride as before, however, due to the lower condensation temperature, compounds such as sulfur monochloride, which is liquid below about 135° C., and sulfur dichloride which is liquid below about 60° C., will also be condensed to form a semiliquid mud or mush with the solid vanadium trichloride. It appears that the vanadium trichloride does not dissolve in the liquid sulfur monochloride. After condensation, the mixture of vanadium trichloride and sulfur monochloride, and possibly other sulfur-chlorine compounds, is reheated to volatilize these impurities. Reheating is accomplished at temperatures at between 140° C. and 250° C., which will insure, after a suitable period of time at such temperature, that substantially all the volatile contaminants are eliminated.

It has been found that condensed vanadium trichloride may be heated at a temperature up to 250° C. to eliminate volatile impurities without serious loss by volatilization of the vanadium trichloride. At the higher temperatures within the range of 140° C. to 250° C. some loss of vanadium trichloride will be encountered. This will ordinarily be insignificant, however, and will not materially affect the over-all economy of the working process. At lower temperatures within the range of 140° C. to 250° C., a longer time of reheating may be necessary to eliminate the undesirable volatile compounds but at such lower temperatures less volatilization and loss of the vanadium trichloride product results.

The following examples will illustrate practice of selected embodiments of this invention.

*Example 1*

A mixture of 169 parts by weight of vanadium oxytrichloride, $VOCl_3$, and 56 parts by weight of sulfur monochloride, $S_2Cl_2$, is introduced into a furnace whose interior is maintained at about 610° C., concurrently with 15 parts by weight of chlorine gas. The hot gaseous mixture from the furnace is cooled to room temperature resulting in condensation of some liquid sulfur monochloride together with solid vanadium trichloride, $VCl_3$. The mixture of sulfur monochloride and vanadium trichloride is then heated at a temperature of about 200° C. for about 10 minutes to volatilize sulfur monochloride and other volatile contaminants, resulting in production of vanadium trichloride substantially sulfur free and contains less than 0.3% oxygen.

*Example 2*

A mixture of 169 parts by weight of vanadium oxytrichloride in admixture with 28 parts by weight of sulfur is introduced into a furnace whose interior is maintained at about 600° C. together with 43 parts by weight of chlorine gas. The hot gaseous mixture from the furnace is cooled to a temperature of 180° C. to condense solid vanadium trichloride, and without condensing sulfur chloride compounds. The so-produced vanadium trichloride is found to be substantially sulfur free and contains less than 0.3% oxygen.

An important feature of this invention is that the vanadium trichloride product is substantially oxygen and sulfur free. By substantially oxygen and sulfur free is meant containing only a few tenths of one percent, and at most 0.5% of these elements in the aggregate, so that the vanadium trichloride product is of acceptable purity for use for example in a reduction process wherein it is reacted with metallic magnesium to produce vanadium metal. Best over-all purity of vanadium trichloride is obtained, as hereinbefore described, if the vanadium oxytrichloride is first freed from metallic impurities such as chloride salts of aluminum, silicon and iron.

The process of this invention produces a surprisingly pure grade of vanadium trichloride, with respect to sulfur and oxygen content. The sulfur appears to act efficiently as a reducing agent at the elevated temperature employed and the presence of chlorine appears to promote the reduction reaction and at the same time prevent formation or the presence in the product of vanadium sulfur compounds such as vanadium sulphide. Furthermore, the product has been found by analysis to correspond closely to the formula $VCl_3$ so that efficient production of the vanadium trichloride salt is indicated without the presence of significant amounts of higher or lower chlorides such as $VCl_2$ or $VCl_4$.

This application is a continuation-in-part of my copending application Serial No. 805,701, filed April 13, 1959, now abandoned.

I claim:

1. A process for producing vanadium trichloride which comprises; introducing vanadium oxytrichloride, sulfur and chlorine into a reaction zone maintained at a temperature of between 450° C. and 650° C., said sulfur being introduced in amount in excess of that required theoretically to combine with the oxygen content of said vanadium oxytrichloride to form sulfur dioxide and said chlorine being introduced in amount in excess of that required theoretically to react to form sulfur monochloride with the excess of said sulfur introduced, thereby to form a hot gaseous mixture containing vanadium trichloride, chlorine and sulfur monochloride by-product, and cooling said hot gaseous mixture to condense solid vanadium trichloride.

2. A process for producing vanadium trichloride which comprises; introducing vanadium oxytrichloride, sulfur and chlorine into a reaction zone maintained at a temperature of between 450° C. and 650° C., said sulfur being introduced in amount in excess of and up to five times that required theoretically to combine with the oxygen content of said vanadium oxytrichloride to form sulfur dioxide and said chlorine being introduced in amount in excess of and up to ten times that required theoretically to react to form sulfur monochloride with the excess of said sulfur introduced, thereby to form a hot gaseous mixture containing vanadium trichloride, chlorine and sulfur monochloride by-product, and cooling said hot gaseous mixture to condense solid vanadium trichloride.

3. A process for producing vanadium trichloride which comprises; introducing vanadium oxytrichloride, sulfur and chlorine into a reaction zone maintained at a temperature of between 450° C. and 650° C., said sulfur being introduced in amount in excess of that required theoretically to combine with the oxygen content of said vanadium oxytrichloride to form sulfur dioxide and said chlorine being introduced in amount in excess of that required theoretically to react to form sulfur monochloride with the excess of said sulfur introduced, thereby to form a hot gaseous mixture containing vanadium trichloride, chlorine and sulfur monochloride by-product, and cooling said hot gaseous mixture to a temperature between 150° C. and 200° C. to condense and separate vanadium trichloride therefrom.

References Cited in the file of this patent

UNITED STATES PATENTS

| | | |
|---|---|---|
| 2,230,538 | Jenness et al. | Feb. 4, 1941 |
| 2,415,958 | Meyers | Feb. 18, 1947 |
| 2,512,807 | Nicholson | June 27, 1950 |
| 2,758,009 | Guthrie | Aug. 7, 1956 |

OTHER REFERENCES

Funk et al.: Wissenschaftliche Zeitschrift der Martin-Luther-Universität (Halle-Wittenberg), vol. 6, No. 5, pages 815–822 (1956–57).

Abstract in Chem. Abs., vol. 54, page 12860 (July-August 1960).

Mellor: "Comprehensive Treatise on Inorganic and Theoretical Chemistry," vol. 9, pages 803–808 (1929), Longmans, Green and Company, New York.